United States Patent [19]
Uchidoi et al.

[11] 4,395,098
[45] Jul. 26, 1983

[54] SHUTTER TIME CONTROL CIRCUIT

[75] Inventors: Masanori Uchidoi, Yokohama; Kazunobu Urushihara, Inagi, both of Japan

[73] Assignee: Canon Kabushiki Kaisha, Tokyo, Japan

[21] Appl. No.: 309,385

[22] Filed: Oct. 7, 1981

Related U.S. Application Data

[63] Continuation of Ser. No. 147,268, Feb. 5, 1980, abandoned.

[30] Foreign Application Priority Data

May 8, 1979 [JP] Japan .................................. 54-56541

[51] Int. Cl.³ .............................................. G03B 7/08
[52] U.S. Cl. .................................... 354/23 D; 354/50
[58] Field of Search ................... 354/23 D, 43, 50, 51, 354/60 R, 60 A, 234, 235, 238, 258

[56] References Cited

U.S. PATENT DOCUMENTS 3,683,767 8/1972 Sahara ..................................... 354/51
4,034,383 7/1977 Mashimo et al. ................. 354/23 D Primary Examiner—Russell E. Adams
Attorney, Agent, or Firm—Toren, McGeady and Stanger

[57] ABSTRACT

The present invention relates to a shutter time control circuit for a camera having a focal plane shutter and a timer circuit for counting the shutter time in a digital way. In accordance with the present invention a preset means for presetting the amount of the overlapping of the shutter curtain and/or the response delay of the magnet on the timer circuit as digital values is provided in such a manner that the clock time is compensated in accordance with the preset digital value so as to compensate the exposure error due to the overlapping amount of the shutter curtains and so on, which makes it possible to offer a digital exposure compensation device suited for the camera having a shutter control circuit for digitally controlling the shutter time.

5 Claims, 13 Drawing Figures (a)

FIG.5

| SHUTTER TIME | A-D CONVERTER OUTPUT | | | | DECODER OUTPUT |
|:---:|:---:|:---:|:---:|:---:|:---:|
| | $Q_4$ | $Q_3$ | $Q_2$ | $Q_1$ | |
| 8 | 1 | 1 | 1 | 0 | $Q_{14}$ |
| 4 | 1 | 1 | 0 | 1 | $Q_{13}$ |
| 2 | 1 | 1 | 0 | 0 | $Q_{12}$ |
| 1 | 1 | 0 | 1 | 1 | $Q_{11}$ |
| $\frac{1}{2}$ | 1 | 0 | 1 | 0 | $Q_{10}$ |
| $\frac{1}{4}$ | 1 | 0 | 0 | 1 | $Q_9$ |
| $\frac{1}{8}$ | 1 | 0 | 0 | 0 | $Q_8$ |
| $\frac{1}{15}$ | 0 | 1 | 1 | 1 | $Q_7$ |
| $\frac{1}{30}$ | 0 | 1 | 1 | 0 | $Q_6$ |
| $\frac{1}{60}$ | 0 | 1 | 0 | 1 | $Q_5$ |
| $\frac{1}{125}$ | 0 | 1 | 0 | 0 | $Q_4$ |
| $\frac{1}{250}$ | 0 | 0 | 1 | 1 | $Q_3$ |
| $\frac{1}{500}$ | 0 | 0 | 1 | 0 | $Q_2$ |
| $\frac{1}{1000}$ | 0 | 0 | 0 | 1 | $Q_1$ |

SHUTTER TIME CONTROL CIRCUIT

This is a continuation of application Ser. No. 147,268 filed May 5, 1980, now abandoned.

BACKGROUND OF THE INVENTION

1. Field of the Invention

The present invention relates to a shutter time control circuit for compensating the exposure error due to the overlapping amount of the focal plane shutter curtains and so on.

2. Description of the Prior Art

Generally, in case of a camera with focal plane shutter the leading shutter curtain is let to start with the shutter release while the timer circuit for controlling the exposure time is actuated so as to carry out the clock operation, while the tail shutter curtain is let to start at the time at which the exposure time is clocked by means of the timer circuit in order to control the exposure time. However, in case of the focal plane shutter it is necessary to overlap the leading shutter curtain on a part of the tail shutter curtain at the time of the shutter charging as well as before the start of the operation, while these unavoidably exists are response delay of the tail shutter curtain holding magnet, so that it is possible that the clocked exposure time could correspond to the actual film exposure time due to the difference between the starting position of the leading shutter curtain and that of the tail shutter curtain or the response delay of the magnet. Consequently, the clock operation is started by means of the timer circuit along with the start of the leading shutter curtain while the tail shutter curtain is let to start at the time at which the clock operation by means of the timer circuit has been completed, in accordance to which a precise exposure control is impossible. Namely, in case of the focal plane shutter, as is shown in FIGS. 1(a) and (b), the starting position FS1 at which the end of the leading shutter curtain starts and the starting position rs1 at which the front of the tail shutter curtain starts are deviated from the exposure opening position a1 toward a2. Consequently, even if the leading shutter curtain is let to start to run at the time point t1, the clock operation is started at the time point t1 as is shown in FIG. 1(c) and the tail shutter curtain holding magnet is actuated at the time point t2 after the lapse of the exposure time Te so as to allow the tail shutter curtain to start to run, the tail shutter curtain only starts to run at the time point t3 after the lapse of the response delay Tmg of the tail shutter holding magnet, while further there exists a time difference Tg due to the difference of the starting points between the leading and the tail shutter curtain, so that the actual film exposure time TA becomes shorter than the clocked time Te, namely does not correspond to the clocked time Te in such a manner that the exposure time cannot be controlled in a precise way. Namely, as is clear from FIGS. 1(b) and (c), there exists a relation $TA+Tg=Te+Tmg$ among the response delay Tmg of the magnet, the overlapping time Tg of the shutter curtains, the clocked time Te and the actual film exposure time TA, namely $TA=Te+Tmg-Tg$ and $TA \neq Te$. Consequently, even if the time is clocked precisely, it is impossible to control the actual film exposure time precisely. Namely, as is clear from FIGS. 1(b) and (c), the actual film exposure time TA is shorter than Te by $Tg-Tmg$, so that unless the clocked time should be prolonged by $Tg-Tmg$ as is shown in FIG. 1(d), it would be impossible to control the exposure time precisely.

In order to overcome such difficulties, several methods have been proposed, as is disclosed for example out of U.S. Pat. Nos. 3,683,767 and 3,721,166, in accordance to which beside the clock circuit a CR timer circuit is provided or a resistance is connected in series with the timer circuit consisting of a photoelectric element and a condenser so as to prolong the clock time. However, the above method is suited for the clock circuit constituting the analog control electronic shutter consisting of a photoelectric element such as CdS and so on and a condenser, but not to the so called digital control electronic shutter for controlling the shutter so designed that the clock pulses are counted by means of a counter so as to deliver a signal for closing the shutter when the value counted by means of the counter has reached a shutter time value corresponding to the brightness or the like. Further, DOLS 2440679 has proposed a camera to designed that the digital control electronic shutter is provided with a delay circuit in such a manner that after the lapse of the time determined by means of the delay circuit the counter starts counting operation so as to prolong the actual clocked time in order to eliminate the above difficulties. However, even in case of the above method it is necessary to make use of a one shot circuit as delay circuit, so that there still exists a problem for the matching with the digital control camera.

SUMMARY OF THE INVENTION

An object of the present invention is to offer a compensation circuit suited for the digital shutter control circuit so designed that a time information corresponding at least the overlapping amount of the focal plane shutter curtains and/or the response delay of the magnet are preset as digital value so as to compensate the exposure error due to the overlapping amount of the shutter curtains and/or the response delay of the magnet in order to always obtain a proper exposure.

Another object of the present invention is to offer an exposure control circuit suited for a camera having a shutter control circuit so designed that the digital information corresponding at least the overlapping amount of the focal plane shutter curtains and/or the response delay amount of the magnet are set in the clock circuit for digitally clocking the shutter time in such a manner that the clocked time is compensated by means of the preset digital value so as to compensate the exposure error due to the overlapping amount of the shutter curtains and/or the response delay amount of the magnet in order to control the shutter time in a digital way.

Further other objects of the present invention will become obvious from the explanations to be made below in accordance with the accompanying drawings of the embodiments.

BRIEF DESCRIPTION OF THE DRAWINGS

FIG. 5 shows the relation among the outputs of the AD converter, the outputs of the decoder in FIG. 3, and the shutter time values.

DESCRIPTION OF THE PREFERRED EMBODIMENTS

Below the shutter time control circuit in accordance with the present invention will be explained in detail.

Figure 1:
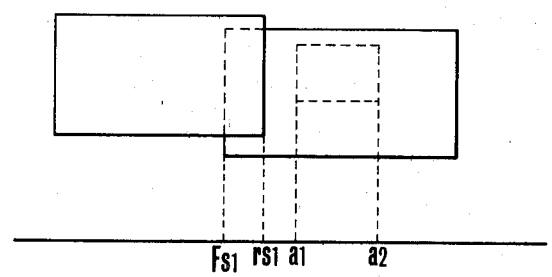
FIG. 1(a) shows the positions of the focal plane shutter curtains with reference to the aperture openings.
FIG. 1(b) shows a drawing for explaining the positions of the focal plane shutter curtains with reference to the aperture openings.
FIGS. 1(c) and (d) show drawings for explaining the relation between the clocked time and the film exposure time.
Figure 1:
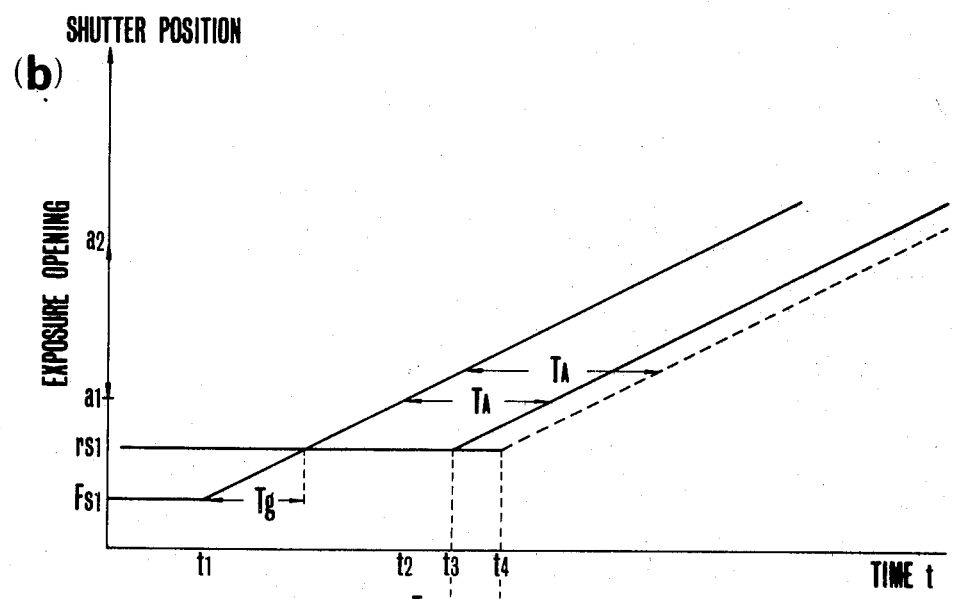
Figure 1:
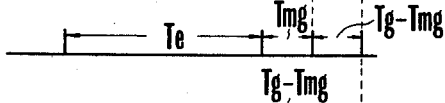
Figure 1:
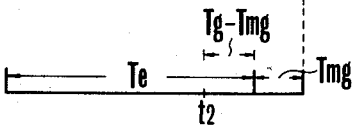
Figure 2:
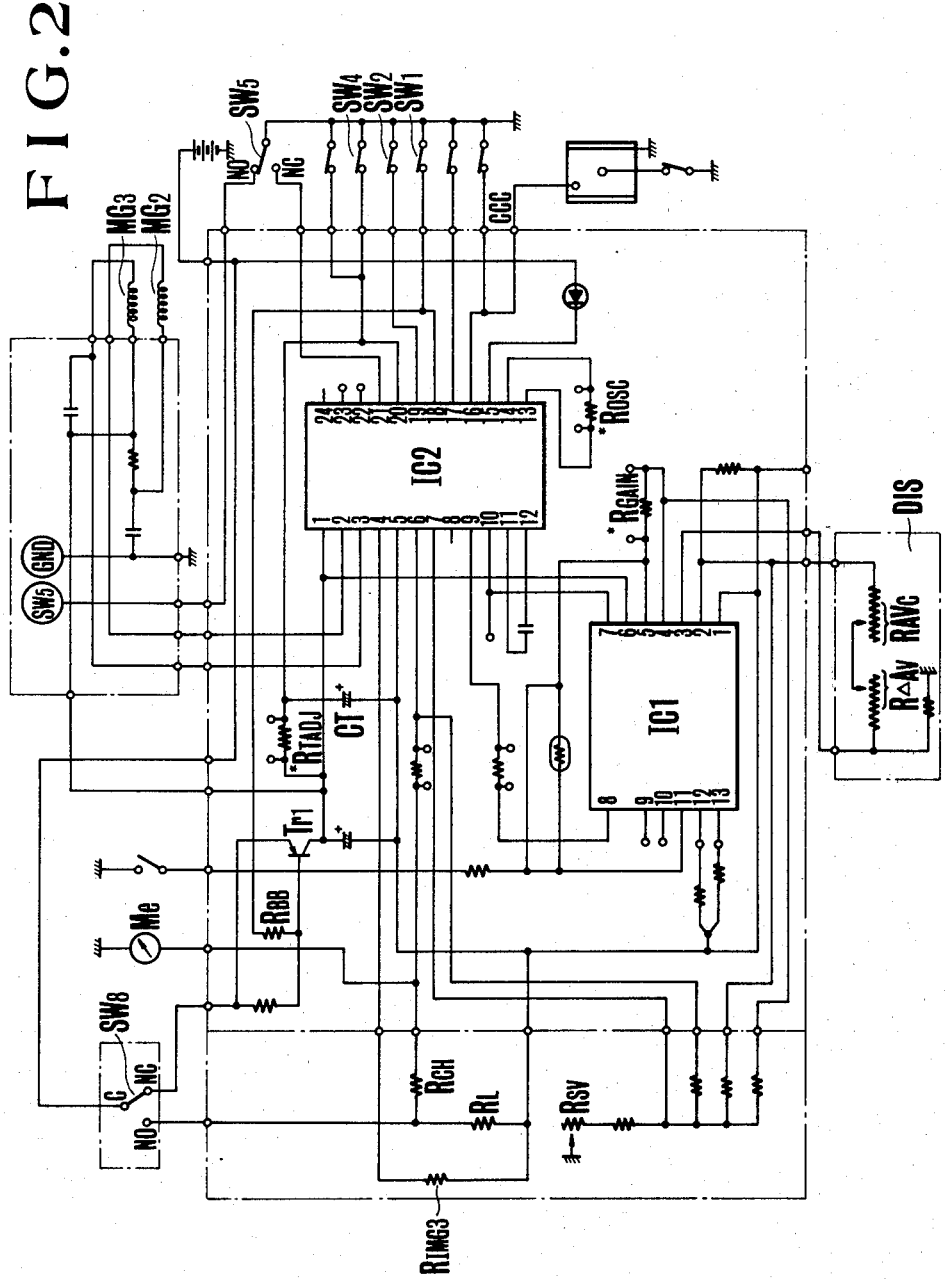
FIG. 2 shows the whole circuit diagram of the camera to which the shutter control circuit in accordance with the present invention is applied.

FIG. 2 shows the whole circuit diagram of the camera to which the shutter time control circuit in accordance with the present invention is applied. Hereby, DIS is the information setting means having the aperture information setting resistances RΔAr, RAVC for setting the aperture informations such as ΔAv (Diaphragm step number information, Avc (Vignetting compensation information) and so on, Rsv is the film sensitivity information inputting resistance and IC1 is the IC for light measurement and calculation for producing an analogue output corresponding to the shutter time information for the proper exposure in accordance with the brightness information, the aperture information and the film sensitivity information, IC2 is the IC having the AD converter for converting the analogue of IC1 into a digital value, the photographing sequence control circuit and the shutter time control circuit in accordance with the present invention, Rosc is the resistance for constituting the clock pulse oscillator, SW1 is the switch to be closed along with the first stroke of the shutter release, RBB, Tr1 are the resistance and the transistor for constituting the power source circuit, RTADJ, CT are the time adjusting circuit consisting of a resistance and a transistor for setting the compensation time, Mg3 is the shutter tail curtain holding magnet, Mg2 is the first release magnet, Bat is the power source, SW2 is the switch to be closed along with the second stroke of the shutter, SW4 is the count switch to be opened in synchronization of the start of the shutter leading curtain and Me is the meter. SW8 is the battery check switch which is normally closed so as to be in contact with Nc and changed over to be in contact with No in operative engagement with an operation member not shown in the drawing at the time of the battery checking. RCH, RIMg3 and RL are the battery checking resistances. SW5 is the switch which is in contact with Nc in operative engagement with the shutter mechanism from the completion of the shutter winding up till the completion of the running of the shutter tail curtain and with No in other photographing phase. Other switches are those for controlling the photographing sequence, having nothing to do with the present invention so that their explanations are emitted here.

Figure 3:
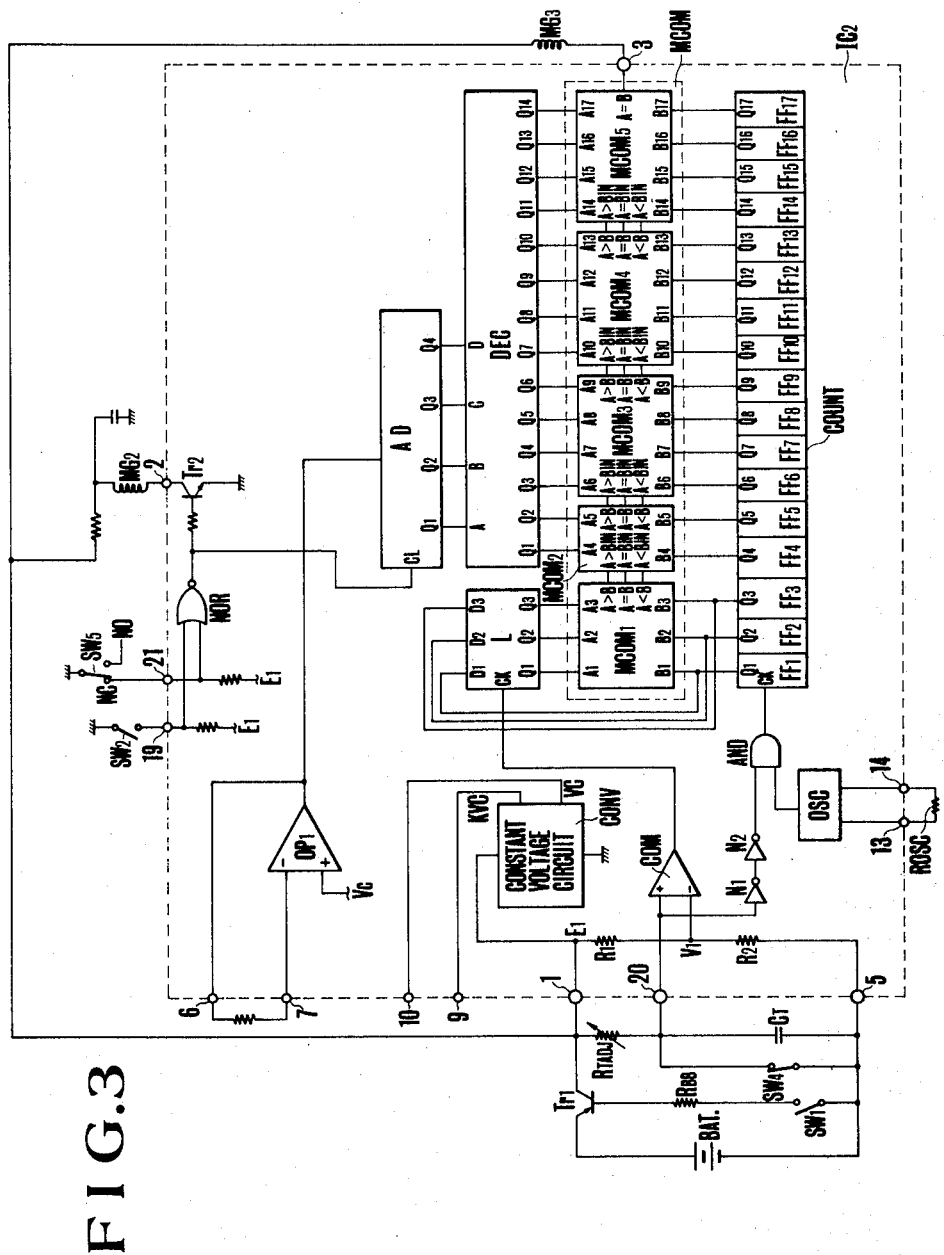
FIG. 3 shows the circuit of an embodiment of IC, IC2 shown in FIG. 2.

FIG. 3 shows a circuit diagram for explaining the composition of IC2 shown in FIG. 2. The members having the same figures in FIG. 2 are the same members. In the drawing, R1 and R2 are the series resistances for constituting a voltage dividing circuit. COM1 is the comparator which produces a high level signal (hereinafter called "1") after the lapse of a time set by means of the time adjusting circuit consisting of the resistance RTADJ and the condenser CT so as to latch the output of the latch circuit L. N1 and N2 are the inverters, whereby when the count-switch SW4 is opened in synchronization of the start of the leading shutter curtain the inverter N2 produces the output "1" so as to open the AND gate AND in order to transmit the clock pulses from the pulse generator OSC to the clock binary counter COUNT. AD is the analogue-to-digital converter (AD converter) for converting the shutter time information from the above IC1 into a digital value, DEC is the binary-to-decimal decoder for decoding the output of the AD converter so as to deliver the "1" signal from a determined output and MCOM is the magnitude comparator for comparing the inputs from the input terminals A1-A17 (A input) with those from the input terminals B1-B17 (B input) so as to deliver a low level signal (hereinafter called "0") when the B input is larger than the A input, namely A≦B. The comparator consists of 5 comparators MCOM1-MCOM5. Hereby, the relations among the shutter time values, the outputs of the AD converter and those of the decoder DEC are as is shown in FIG. 5.

CONV is the constant voltage circuit for producing certain determined standard voltage kVc, Vc by means of the input voltage E1 and OP1 is the operational amplifier. The (−) input terminal of the amplifier OP1 is connected to the terminals 2 and 4 or IC and IC1 through the terminal 7 and the resistance so as to produce a voltage corresponding to the shutter time value in accordance with the object brightness information and the preset information. The output of the amplifier OP1 is delivered to the analogue-to-digital converter AD. NOR is the NOR gate, whose input terminal is connected to the switches SW2 and SW5 through the terminals 19 and 21. The output terminal of the NOR gate is connected to the input terminal CL of the analogue-to-digital converter AD so as to latch the output of the AD converter by means of the "1" signal from the NOR gate. Tr2 in the transistor whose base is connected to the output of the NOR gate and whose collector is connected to the magnet Mg2.

Figure 4:
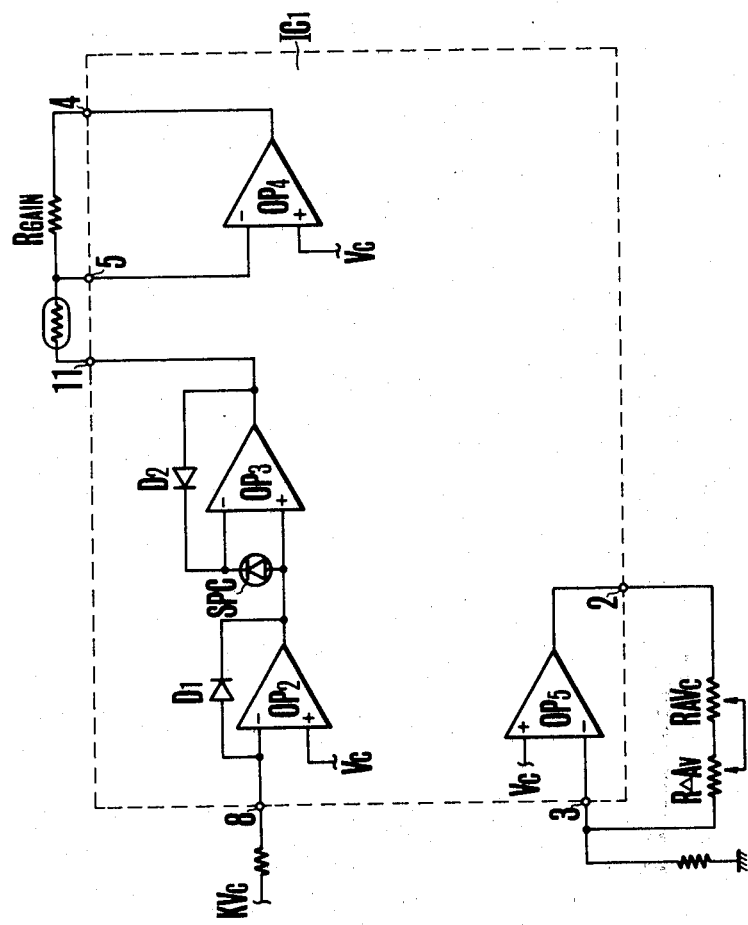
FIG. 4 shows the circuit of an embodiment of IC, IC1 shown in FIG. 2.

FIG. 4 shows the circuit diagram of IC and IC2 shown in FIG. 2. In the drawing, OP2 is the temperature compensation operational amplifier in whose feed back circuit the diode D1 is connected. OP3 is the light measurement amplifier between whose input terminals the light sensing element SPC is connected and in whose feed back circuit the logarithmically compressing diode D2 is connected. The amplifier OP3 produces a voltage corresponding to the logarithmic value of the object brightness. OP4 is the amplifier to whose input terminal the resistance RGAIN is connected. OP5 is the operational amplifier in whose feed back circuit the resistance RΔAv and RAVc are connected so as to produce a voltage corresponding to the aperture value information set on the resistances RΔAv and RAVc. The output of the operational amplifiers OP4 and OP5 are connected to the amplifier OP1 through the terminals 2 and 4 and the resistance and the input terminal 7 of IC, IC2 in FIG. 3.

Below, the operation of the embodiment shown in FIG. 2 to FIG. 4 will be explained in detail. When the shutter button not shown in the drawing is pushed down, the switch SW1 is closed along with the first stroke so as to bring the transistor Tr1 in the switched on state. Thus, the current is supplied to the whole circuit, whereby by means of the magnet Mg3 the tail shutter curtain is held. Further, the shutter time value is calculated by means of IC1 and converted into the digital value by means of the AD converter AD. Namely, when the switch SW1 is closed so as to bring the transistor Tr1 in the switched on state, the voltage E1 is applied to the constant voltage circuit CONV in such a manner that the constant voltage Vc and kVc are delivered to the whole circuits so as to bring the whole amplifiers into the operative state. Hereby the operational amplifier OP4 produces a voltage corresponding to the brightness of the light beam incident upon the light sensing element SPC through the lens. Further, the amplifier OP5 delivers a voltage corresponding to the set aperture information. The output voltages from these amplifiers are delivered to the operational amplifier OP1 shown in FIG. 3 so as to be calculated together with the film sensitivity information, whereby the amplifier OP1 delivers a voltage corresponding to the shutter time value in accordance with the object brightness. Thus, the voltage corresponding to the shutter time value is delivered to the analogue-to-digital converter so as to be repeatedly converted into a digital value. Now, let us suppose that the shutter is wound up state. The switch SW4 is in contact with NC. When in this state the release button is futher pushed down, the switch SW2 is closed and the NOR gate NOR produces a "1" signal to be delivered to the input terminal CL of the analogue-to-digital converter so as to latch the output of the AD converter.

Figure 6:
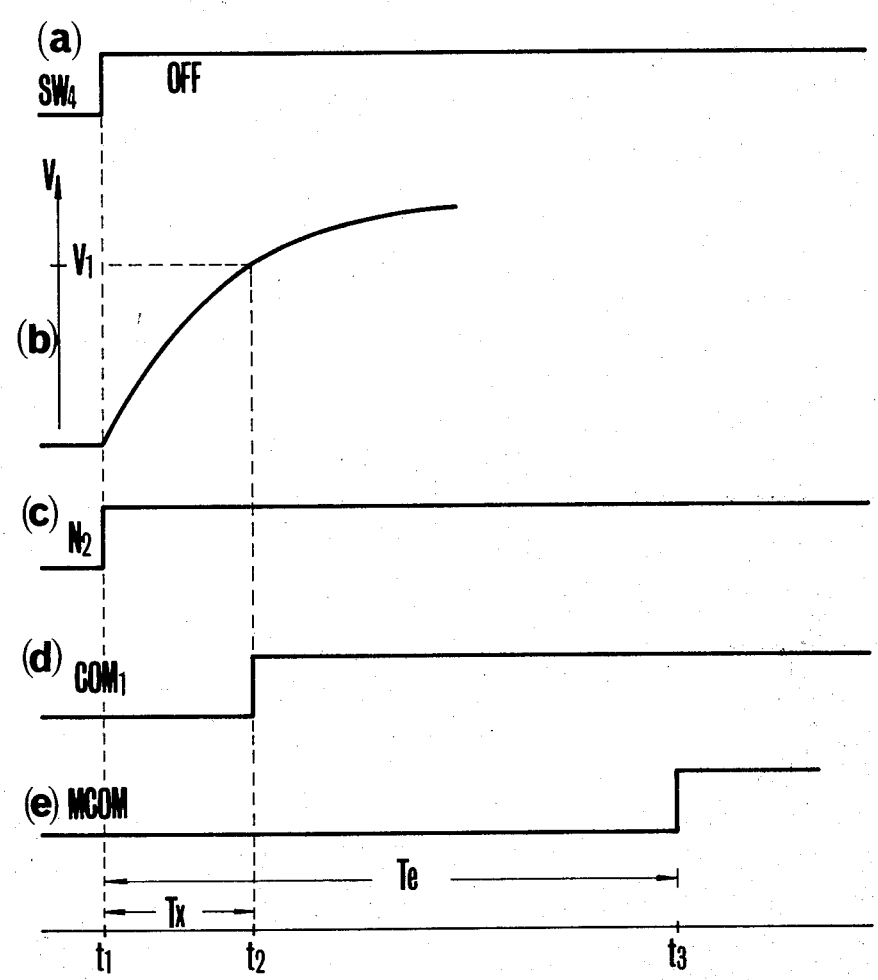
FIG. 6 shows the wave forms for explaining the operation of FIG. 3.

Now, let us suppose that the amplifier OP1 produces a voltage corresponding to 1/1000 sec. Then the analogue-to-digital converter AD delivers an output "0, 0, 0, 1", while the "1" signal is delivered from the output terminal Q1 from the decoder DEC as is shown in FIG. 5. Further, as mentioned above, when the "1" signal is delivered from the NOR gate NOR, the transistor Tr2 is brought into the switched on state so that the magnet Mg2 is actuated so as to release the first holding and allow the start of the leading shutter curtain at the time point t1 in FIG. 6, whereby at the same time, the switch SW4 is opened in operative engagement with the start of the leading shutter curtain as is shown in FIG. 6(a). Thus, the time constant circuit consisting of the resistance RTADJ and the condenser CT is actuated, whereby the output varies as is shown in FIG. 6(b). Further, when the switch SW4 is opened the inverter N2 delivers an output "1" as is shown in FIG. 6(c) so that the AND gate AND assumes the opened state, whereby the pulses are transferred from the pulse generator OSC to the counter COUNT, which start the clock operation. When then the output of the time constant circuit reaches V1 the comparator COM1 produces the "1" signal as is shown in FIG. 6(d) in such a manner that the content in the lower three bits of the counter COUNT is latched in the latch circuit L. Namely, the value counted by means of the counter COUNT within the time Tx determined by the time constant circuit (RTADJ, CT) from the starting time point t1 of the clock operation by means of the counter is latched in the latch circuit. Now, let us suppose that one pulse is counted by means of the counter COUNT in the time interval Tx. The content of the counter COUNT at the time point t2 is such that the Flip-Flop FF1 delivers the "1" signal so that the output terminal Q1 of the latch circuit delivers the "1" signal, while Q2 and Q3 deliver the "0" output. After then the count operation of the counter COUNT goes on till the outputs Q1 and Q4 of the Flip-Flop FF1 and FF4 become "1", when the "1" signal is applied to the B input terminals B1 and B4 of the comparator. Further, because as mentioned above the control time is 1/1000 sec. the output terminal Q1 of the decoder DEC and that Q1 of the latch circuit L deliver the "1" signals so that the A1 and A4 of the A input terminal of the comparator MCOM are supplied with the "1" input in such a manner that the A input and the B input of the comparator MCOM correspond to each other, whereby at the time point t3 the output of the comparator MCOM is inversed so as to be "0". Thus, the magnet Mg3 is actuated so as to allow the start of the tail shutter curtain and terminate the exposure. The value counted until the outputs Q1 and Q4 of the counter deliver "1" during the above process is 9 (=8+1), whereby it is necessary to count 9 pulses till the output of the comparator MCOM is inversed. Now, let us suppose that the pulse from the clock pulse generator OSC is with 8 KHz. Then, the clock time Te from the clock start time point t1 up to the inversing time point t3 of the comparator MCOM is ⅛ KHz×9 (=1 ms+⅛ ms=1/1000 sec.+0.125 ms).Thus, the clock time Te can be prolonged by a certain time Tx (=0.125 ms) for the film exposure time TA (=1/1000 sec.). Consequently, when the time Tx is adjusted to be Tg−Tmg, a precise time control can always be carried out. Namely, in case Tg−Tmg is equal to 0.125 mg, as mentioned above, the clock time can be prolonged by Tg−Tmg in such a manner that the shutter is controlled precisely. Further, the time Tx (=0.125 ms) is decided by means of the output of the latch circuit L, while the content of the latch circuit L is divided by means of the time interval between the clock time point t1 and the inversion time point of the comparator COM1 so that by adjusting the value of the time constant circuit (RTADJ, CT), tx=Tg−Tmg can be established in such a manner that the exposure time can be compensated very easily.

The above explanation is for the case of 1/1000 sec. For the case of 1/500 sec. as is shown in FIG. 5, the "1" signal is delivered from the output terminal Q2 of the decoder DEC, so that the A1 and A2 of the A input terminal of the comparator MCOM deliver the "1" signals, whereby when the "1" signal is delivered from the output terminals Q1 and Q5 of the counter COUNT the comparator MCOM is inversed. Thus, the value to be counted by means of the counter necessary to inverse the comparator MCOM is 17 pulses (=16+1), so that the clock time Te is ⅛ KHz×17 (2 ms+⅛ ms=1/500 sec.+0.125 ms). Namely in the same way as for the case of 1/1000 sec. the clock time Te can be prolonged by 0.125 ms (−Tg−Tmg), so that a precise shutter time control can always be carried out. Further, for the case of other times, the clock time can be prolonged by Tg−Tmg in the same way so as to be able to carry out the precise shutter time control.

The above explanation is for the case of Tg−Tmg=0.125 ms. Hereby it goes without saying that in case Tg−Tmg is not equal to 0.125 ms, Tx=Tg−Tmg can be established by varying the value to be latched by means of the latch circuit.

As explained above, in case of the shutter time control circuit in accordance with the present invention, by presetting the digital value corresponding to the time error such as due to the overlapping of the clock counter curtain, the response delay of the magnet and so on the clock time is prolonged by a certain determined time so as to control the film exposure time precisely, which is quite profitable for the shutter time control circuit. Further, the error can be compensated by simply presetting a digital value, so that the time error can easily be adjusted, even when the amount of the overlapping of the shutter curtains or the response delay of the magnet are different from each camera so that the time error has to be adjusted for each camera.

Further, the compensation amount has only to be preset in the clock counter circuit so that a compensation circuit suited for the electronic shutter digitally controlled can be offered.

What is claimed is:

1. A shutter control circuit for a shutter having a mechanical condition producing a delay, comprising:
   (a) a counter circuit for counting pulses when a shutter release operation is performed;
   (b) a shutter time information circuit for producing a digital value corresponding to an exposure time;
   (c) preset means having impedance means for adjustably presetting time information corresponding to a mechanical condition of the shutter mechanism;
   (d) converting means for converting the time information preset by said impedance means into a digital value;
   (e) a shutter time information setting circuit including a first part coupled to said shutter time information circuit for setting said digital value from the shutter time information circuit and a second part coupled to said converting means for setting said digital value from the converting means;
   (f) a shutter time control circuit coupled to said counter circuit and the first and second parts of said shutter time information setting circuit, said shutter time control circuit forming a shutter closing signal when the value counted by said counter circuit has assumed a value corresponding to the sum of the digital values set by said first and second parts of the shutter time information setting circuit; and
   (g) shutter control means for closing the shutter in response to the closing signal.

2. A shutter control circuit for a shutter having a mechanical condition producing a delay, comprising:
   (a) a counter circuit for counting pulses when a shutter release operation is performed;
   (b) preset means having impedance means for adjustably presetting time information corresponding to a mechanical condition of the shutter mechanism;
   (c) detecting means for producing a detecting signal when the value counted by said counter circuit has assumed a value corresponding to said impedance means;
   (d) a shutter time information setting circuit including a first part for setting a digital value corresponding to the exposure time and a second part to which the output of said counter circuit is connected, said second part being responsive to the output of said detecting means arranged for setting a digital value corresponding to the content of the counter when said detecting means produces an output;
   (e) a shutter time control circuit coupled to said counter circuit and the first and second parts of said shutter time information setting circuit for forming a shutter closing signal when the value counted by said counter circuit has assumed a value corresponding to the sum of the digital values set by said first and second parts of the shutter time information setting circuit; and
   (f) means for closing the shutter in response to the closing signal.

3. A shutter control circuit for a shutter having a mechanical condition producing a delay, comprising:
   (a) a counter circuit for counting pulses when a shutter release operation is performed;
   (b) preset means having impedance means for adjustably presetting time information corresponding to a mechanical condition of the shutter mechanism;
   (c) a timer for counting the time and producing an output after counting the time corresponding to the impedance of said impedance means, said timer being arranged to be actuated by the shutter release operation;
   (d) a shutter time information setting circuit including a first part for setting a digital value corresponding to the exposure time and a second part to which the output of said counter circuit is connected, said second part being responsive to the output of said timer and arranged for setting a digital value corresponding to the content of the counter when said timer produces an output;
   (e) a shutter time control circuit coupled to said counter circuit and the first and second parts of said shutter time information setting circuit for forming a shutter closing signal when the value counted by said counter circuit has assumed a value correspoding to the sum of the digital values set by said first and second parts of the shutter time information setting circuit; and
   (f) means for closing the shutter in response to the closing signal.

4. A shutter control circuit for a shutter having a mechanical condition producing a delay, comprising:
   (a) a counter circuit for counting pulses when a shutter release operation is performed;
   (b) preset means having impedance means for adjustably presetting time information corresponding to a mechanical condition of the shutter mechanism;
   (c) a shutter time information setting circuit including a first part for setting a digital value corresponding to the exposure time and a second part, said second part having converting means for converting the time information preset by said impedance means into a digital value and setting the digital value converted by said converting means;
   (d) a shutter time control circuit coupled to said counter circuit and the first and second parts of said shutter time information setting circuit for forming a shutter closing signal when the value counted by said counter circuit has assumed a value corresponding to the sum of digital values set by said first and second parts of the shutter time information setting circuit; and
   (e) means for closing the shutter in response to the closing signal.

5. A shutter control circuit according to claims 1, 2, 3, or 4, wherein said shutter time control circuit is arranged to compare the content of said counter and the sum of the digital values set by said first and second parts and forms said shutter closing signal when the former has assumed a predetermined relation to the latter.

* * * * *

UNITED STATES PATENT AND TRADEMARK OFFICE
CERTIFICATE OF CORRECTION

PATENT NO. : 4,395,098
DATED : July 26, 1983
INVENTOR(S) : Uchidoi et al.

It is certified that error appears in the above-identified patent and that said Letters Patent is hereby corrected as shown below:

In the cover page item [63], cancel "Feb." and substitute -- May --.

Signed and Sealed this

Fifteenth Day of November 1983

[SEAL]

Attest:

GERALD J. MOSSINGHOFF

Attesting Officer  Commissioner of Patents and Trademarks